Aug. 20, 1946.  R. A. HEISING  2,406,016
INDICATING DEVICE
Filed March 19, 1942

INVENTOR
R. A. HEISING
BY
E. V. Griggs
ATTORNEY

Patented Aug. 20, 1946

2,406,016

UNITED STATES PATENT OFFICE 2,406,016

INDICATING DEVICE

Raymond A. Heising, Summit, N. J., assignor to Bell Telephone Laboratories, Incorporated, New York, N. Y., a corporation of New York Application March 19, 1942, Serial No. 435,396

3 Claims. (Cl. 177—351)

This invention relates to an electromechanical device for indicating an angle.

The object of the invention is to rotate an indicator through an angle, under the control of electrical currents varying with the sinusoidal and cosinusoidal functions of the angle.

A feature of the invention is a pair of coordinate bars in quadrature relationship respectively moved in accordance with the sinusoidal and cosinusoidal values of an angle.

Another feature of the invention is a pair of potentiometers respectively associated with the coordinate bars to produce voltages opposed to the applied voltages which are adjusted by the bars to equality with the applied voltages.

Further features of the invention are driving systems actuated by the differences between the applied voltages and the voltages selected by the potentiometers to move the respective bars to the position of balance.

Figure 1:
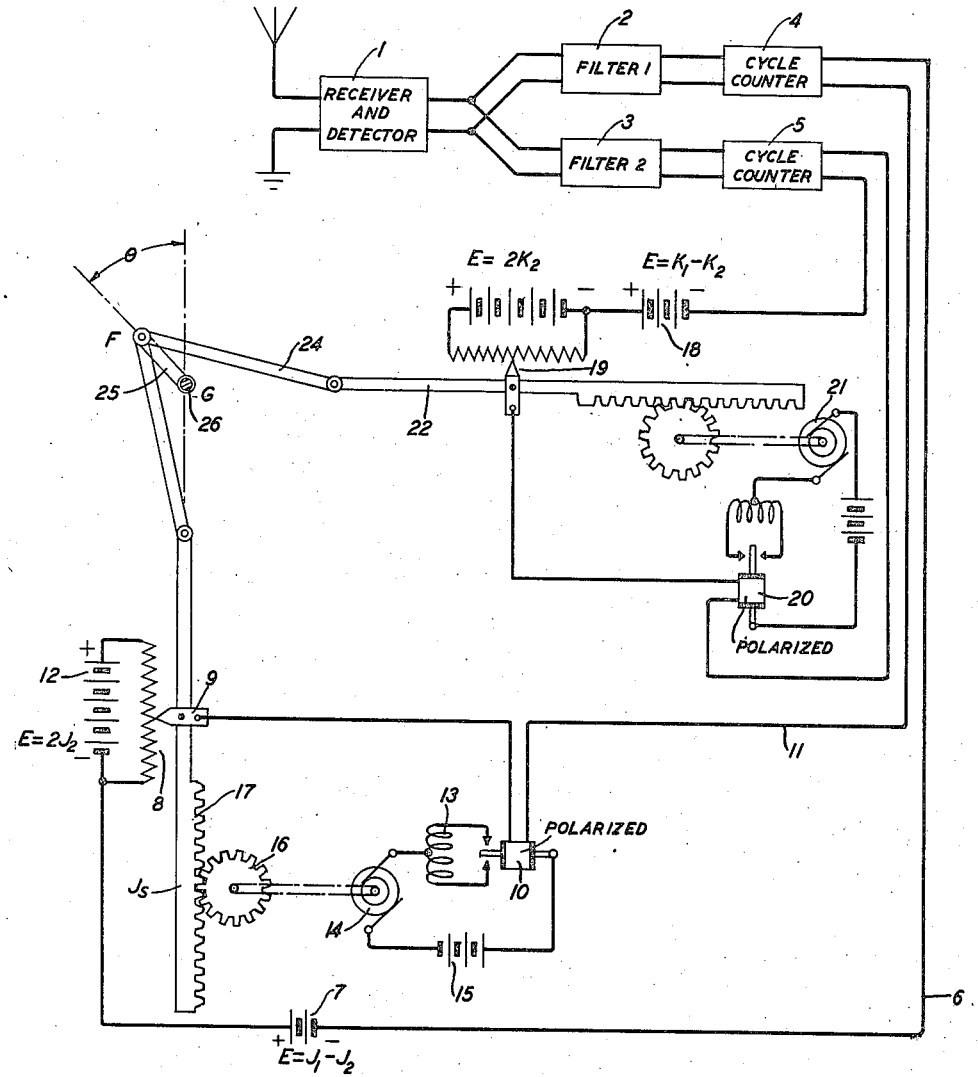
Figure 2:
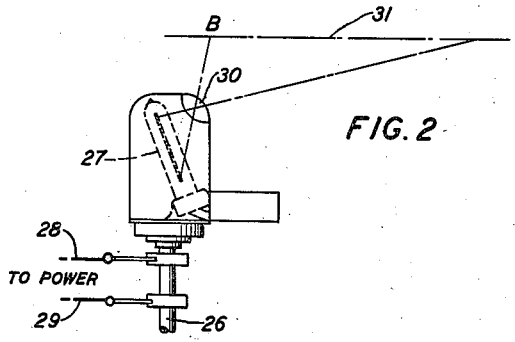

Other features of the invention will be apparent from the following description, and the drawing, in which, Fig. 1 diagrammatically shows a device embodying the invention; and Fig. 2 diagrammatically shows an indicator for Fig. 1.

The present device is actuated by two currents respectively varying with the sine and the cosine functions of the same angle. The production of these currents is not part of the present invention, and any suitable sources may be used. Preferably, the currents may be produced by the radio location system disclosed in my copending application, Serial No. 433,775, filed March 7, 1942, and assigned to the assignee of the present application. This system radiates three radio waves, periodically varying in frequency, the second wave having a small time displacement with respect to the first wave and the third wave having a small time displacement, differing from the first displacement, with respect to the second wave. The three waves are received by the radio receiver 1, and combined to produce a beat frequency wave between the first and the second wave, and a different beat frequency wave between the second and third wave. The first beat frequency wave is selected by the filter 2, and the second beat frequency wave is selected by the filter 3. The wave selected by the filter 2 is supplied to the cycle counter 4 which may be of the type shown in United States Patent 2,113,011, April 5, 1938, E. L. C. White, and produces a current having a variation in amplitude of the form $J_1 \pm J_2 \cos \theta$ where $J_1$ and $J_2$ are constants, and $\theta$ is the desired angle between a mobile body, such as an airplane, and the transmitting antennas. The wave selected by the filter 5 is supplied to the cycle counter 5 which may be similar to the cycle counter 4 and produces a current having a variation in amplitude of the form $K_1 \pm K_2 \sin \theta$, where $K_1$ and $K_2$ are constants and $\theta$ is the angle above.

Current from the cycle counter 4 flows by wire 6, battery 7, potentiometer winding 8, wiper 9, winding of polarized relay 10, wire 11 to cycle counter 4. The battery 7 is adjusted to have a voltage equal to $J_1 - J_2$, and the battery 12, connected across the potentiometer 8 has a voltage equal to $2J_2$. If the voltage from the battery 7, with the voltage selected by the wiper 9 is not equal to the voltage from the cycle counter 5, the relay 10 will operate, connecting the proper field 13 and the armature of the motor 14 to the battery 15. The motor 14 drives the pinion 16 sliding the rack and coordinate bar 17 and moving wiper 9 until the voltage from the battery 7 with the voltage selected by the wiper 9 is equal to the voltage from the cycle counter 5, releasing the relay 10 and stopping motor 14.

The voltage of battery 18 is adjusted to be equal to $K_1 - K_2$. The voltage produced by the cycle counter 5 is opposed by the voltage of the battery 18 and the voltage selected by the wiper 19, and, if there is any difference, the relay 20 is operated, actuating the motor 21 to move the bar 22 and the wiper 19 until the voltage of the battery 18 and the voltage selected by the wiper 19 equals the voltage from the cycle counter 5, releasing the relay 20 and stopping the motor 21.

The relays 10 and 20 are preferably polarized relays, biased to normally rest between the contacts, and when a current is applied, moving to one contact or the other depending upon the polarity of the applied currents. The motors 14, 21, may be any desired type of reversible motor, and are shown as direct current motors with forward and reverse field windings respectively connected to the contacts of relays 10 and 20.

The bars 9 and 22 are respectively connected, as by the links 23, 24, to the crank 25, driving the shaft 26. The bars 9 and 22 are constrained to move in straight lines, by suitable guides, such as grooves, abutments, pins or other known means.

The movements of the bars 9 and 22, operating through the links 23, 24 rotate the crank 25 through the angle $\theta$. Cos $\theta$ is equal in magnitude and sign to cos $(-\theta)$, thus there are two angles which the bar 17 might move the crank 25 to indicate. Also sin $\theta$ is equal in magnitude and sign to sin $(180-\theta)$, thus there are also two angles which the bar 22 might move the crank 25 to indicate. But, there is only one angle $\theta$ which the two bars 17 and 22, operating together, can conjointly indicated by moving the crank 25.

The crank 25 may be furnished with any desired indicator, such as a pointer, a light ray, or a telemetric transmitter. One type of indicator is shown in Fig. 2. This indicator is mounted on an extension of the shaft 26, of the crank 25, and comprises an incandescent lamp 27 having a straight filament. Current is supplied to the filament through any suitable connection, such as the slip rings 28, 29. The axis of the filament may be inclined at a small angle to the axis of the shaft 26. The light from the lamp 27 is focussed by the lens 30 on any desired surface, such as the map 31. If the map 31 is translucent the lamp 27 may be mounted below the map 31, and if the map 31 is opaque, the lamp 27 may be mounted in an inverted position above the map 31. The lamp 27 will project a line of light which is rotated through the angle $\theta$. The shaft 26 is located on the map at the point corresponding to the actual point about which the angle $\theta$ is measured.

What is claimed is:

1. In an indicating system, two slidable bars mutually at right angles, a shaft at the intersection of the axes of said bars, a crank arranged to rotate said shaft, links individual to each bar connecting said bars to said crank, a first source of voltage varying with the sine function of a desired angle, a second source of voltage adjusted by the position of one of said bars opposing the voltage from said first source, reversible motor means controlled by the difference between the voltages from said sources to move said one bar adjusting the voltage from said second source to equality with the voltage from said first source, a third source of voltage varying with the cosine function of said angle, a fourth source of voltage adjusted by the position of the other of said bars opposing the voltage from said third source, other reversible motor means controlled by the difference between the voltages from said third and fourth sources to move said other bar adjusting the voltage from said fourth source to equality with the voltage from said third source, whereby the conjoint movements of said bars rotate said crank to indicate the desired angle.

2. In an indicating system, two slidable bars mutually at right angles, a shaft at the intersection of the axes of said bars, a crank affixed to said shaft, links, individual to each bar, connecting said bars to said crank, reversible motors individually sliding each bar, a polar relay individual to each motor, sources of current individual to each bar, potentiometer windings connected to said sources, brushes associated with said windings, respectively, moved by said bars, a source of voltage varying with the sine function of a desired angle in opposing serial relationship with the polar relay and potentiometer associated with one of said bars, and a source of voltage varying with the cosine function of said angle in opposing serial relationship with the polar relay and potentiometer associated with the second bar, whereby said relays are operated to start said motors and drive said bars turning said crank until the voltages from said potentiometers opposing said applied voltages equal said applied voltages and release said relays, the angular position of the crank then indicating the desired angle.

3. In an indicating system, two slidable bars mutually at right angles, a shaft at the intersection of the axes of said bars, a crank arranged to rotate said shaft, links individual to each bar connecting said bars to said crank, a first source of voltage varying with the sine function of a desired angle, electrical motor means connected to said first source and moving one of said bars, a second source of voltage varying with the cosine function of said angle, other electrical motor means connected to said second source and moving the other of said bars, whereby the conjoint movements of said bars rotate said shaft to indicate said angle.

RAYMOND A. HEISING.